Patented Mar. 8, 1949

2,463,575

UNITED STATES PATENT OFFICE 2,463,575

VINYLIDENE CHLORIDE-BUTADIENE-ETHYL ACRYLATE INTERPOLYMERS

George William Stanton and Charles Everett Lowry, Midland, Mich., assignors to The Dow Chemical Company, Midland, Mich., a corporation of Delaware No Drawing. Application May 16, 1946, Serial No. 670,285

1 Claim. (Cl. 260—84.5)

This invention relates to vulcanizable interpolymers suitable for use as adhesives or as calendered coatings for flexible base materials. It relates in particular to certain interpolymers of vinylidene chloride, butadiene or isoprene, and ethyl acrylate.

Some of the binary copolymers of vinylidene chloride and ethyl acrylate are disclosed and claimed by Wiley in U. S. Patent No. 2,160,945. The binary copolymers of vinylidene chloride and butadiene are disclosed and claimed in U. S. Patents Nos. 2,215,379, 2,376,208 and 2,380,356, issued to the assignees of Sebrell, Tucker and Youker, respectively. Some of the binary copolymers of butadiene and ethyl acrylate are disclosed by Wolfe in U. S. Patent No. 2,335,625 and by Sarbach in U. S. Patent No. 2,278,802.

The vinylidene chloride-ethyl acrylate binary copolymers are thermoplastics which are not rubbery in the usual sense and are not vulcanizable. They range in properties from rigid and relatively insoluble materials at high vinylidene chloride concentrations to progressively more soluble materials as the amount of copolymerized ethyl acrylate increases. The more soluble ones are suitable for use as lacquer bases for the usual solvent type coating operations and some are them are suitable as general purpose adhesives.

The vinylidene chloride-butadiene binary copolymers vary from rigid thermoplastic and highly insoluble materials at vinylidene chloride concentrations above 90 per cent through strong rubbers having from 20 to 50 per cent and more of butadiene. At least when some of the commoner polymerization methods are employed, the vinylidene chloride-butadiene binary copolymers containing from about 60 to 90 per cent of butadiene are factice-like solids of rather low strength which are capable of but little elongation. Though many of them are vulcanizable, this particular binary polymer system is deficient as regards most required coating properties and the products are relatively unsuitable for use as adhesives.

The butadiene-ethyl acrylate binary copolymers range from very weak and tacky materials at high ethyl acrylate concentrations to somewhat rubbery products at high butadiene concentrations. The former class is deficient in abrasion resistance and does not vulcanize to form desirable coating material, while the latter class is also poor in abrasion resistance and has too high a viscosity to be used readily in calender coating operations.

There has long been desired, and it is accordingly an object of the present invention to provide a vulcanizable, synthetic, rubber-like material to serve as an adhesive and which is adapted to form abrasion resistant and moisture impervious coatings, preferably by the relatively simple process of calendering the material on the desired base. A particular object is to provide such a composition which can be employed as an adhesive or as a calendered coating without the use of solvents during the coating operation. A further object is to provide a vulcanizable, synthetic, rubber-like coating material which itself is highly resistant to the action of many common organic solvents. Other and related objects may appear hereinafter.

As used herein, "butadiene" means the compound butadiene-1,3 and isoprene is 2-methyl butadiene-1,3. "Interpolymer" is used to mean the product obtained by the polymerization of a mixture of three or more monomers. To distinguish therefrom, the term "copolymer" is arbitrarily used herein to designate a product similarly derived from a mixture of two monomers.

It has now been found that the foregoing and related objects may be attained through the provision of the ternary interpolymers produced from a monomeric mixture of from 15 to 85 per cent vinylidene chloride, 15 to 50 per cent butadiene and 5 to 70 per cent ethyl acrylate. More particularly the foregoing objects are realized through the provision of an interpolymer from a monomeric mixture of 15 to 70 per cent vinylidene chloride, from 20 to 45 per cent butadiene and from 10 to 50 per cent ethyl acrylate. The preferred interpolymer for use in calendered coatings is one from a monomeric mixture of from 30 to 70 per cent vinylidene chloride, from 20 to 45 per cent butadiene and from 10 to 40 per cent ethyl acrylate. Similarly, the preferred adhesive composition of the present invention is one obtained by the interpolymerization of from 15 to 50 per cent of vinylidene chloride, from 20 to 45 per cent of butadiene and from 30 to 50 per cent of ethyl acrylate.

The ternary interpolymers of the present invention are most conveniently made by the emulsion polymerization process, preferably employing a mildly alkaline aqueous medium as the continuous phase of the emulsion. The new interpolymers have also been made in emulsion using the acidic conditions and catalyst described by Britton and LeFevre in U. S. Patent No. 2,333,633. They have also been made in aqueous suspension, without emulsifying agents, using benzoyl peroxide as the catalyst. For the present purposes of comparison between the various compositions in the interpolymer system under consideration, a standard polymerization procedure was adopted eliminating as far as possible any variations due to changes in relative concentrations of the disperse and continuous phases, catalysts, temperatures, emulsifiers, alkalies and the like. The standard procedure for small scale preparations is as follows:

A stock solution is prepared consisting of 98.5 per cent by weight of pure water, one per cent of a purified grade of sodium lauryl sulfate and 0.5 per cent of sodium carbonate. To 75 parts by weight of the aqueous stock solution is aded 25 parts by weight of the chosen monomers in the proportions being investigated, and 0.125 parts of potassium persulfate is added as a catalyst. The mixture is emulsified by agitation and is kept at a constant temperature of 55° C. in a sealed vessel until polymerization has progressed to the desired extent. There is then added a small amount, suitably about 0.4 per cent, of an anti-oxidant, such as polymerized trimethyl dihydroquinoline. The latex is then coagulated after dilution with water, by addition of a 50 per cent aqueous methanol solution containing 0.4 per cent of magnesium chloride. The coagulum is washed with water and vacuum dried at 70° C. overnight. When making batches involving more than about a gallon of reaction medium the amount of monomer is increased to about 33.3 per cent of the weight of the emulsion and the stock solution is correspondingly fortified to contain about 1.5 per cent of the emulsifying agent and 0.75 per cent of sodium carbonate. The catalyst concentration is increased correspondingly to about .165 per cent.

When the new interpolymers are to be used as adhesives they are spread in any suitable manner upon one of the surfaces to be treated, the second surface is brought into contact with the interpolymer composition which may or may not contain sulfur, fillers, carbon black and other similar well-known rubber addition agents, and the entire assembly is heated under pressure at least for a sufficient period to distribute the adhesive uniformly. When vulcanizing agents are present this treatment is carried to a temperature and for a period of time to effect vulcanization and thermal-curing of the adhesive layer. Thereafter pressure may be released and it will be found that the surfaces are as firmly bonded as has been possible with any of the known adhesive compositions based on natural or other synthetic rubbers. The bond is superior to that obtained with most of the known synthetic rubbers because of the more favorable flow characteristics of the present interpolymers and because of their ability to be vulcanized in situ.

The new interpolymers may be used either in their natural state, or after being compounded, for the purpose of applying coatings to flexible base materials or for the preparation of moldings, sheet or film. A wide variety of formulations may be employed to yield statisfactorily compounded materials from the new interpolymers. For the purposes of the present description, and in order to obtain representative and comparable values in those tests carried out on compounded and vulcanized batches of the present ternary interpolymers, a standard procedure was developed and a standard formulation was employed. That formulation contained the following ingredients in the designated parts by weight:

| | |
|---|---|
| Interpolymer | 100 |
| Stearic acid | 1 |
| Butyl phthalyl butyl glycolate (plasticizer) | 10 |
| Litharge | 5 |
| Benzothiazyl disulfide (accelerator) | 1 |
| Sulfur | 2 |
| Carbon black | 35-40 |

The prefered carbon blacks were selected from the class of "easy processing" channel blacks and "semi-reinforcing" furnace blacks.)

In preparing the test formulations, the interpolymers are first broken down on a cold mill, the addition agents are milled into the interpolymer in the order named, and the mixture is sheeted from the mill. It may be sheeted directly to a calender stack where the compounded sheet is brought into contact with a sheet of paper, cloth, or other flexible base material which it is desired to coat, and the assembly is passed through the stack to effect a reduction in thickness of the coating and to insure the provision of a uniform and continuous coating on the flexible base. The compounded sheet may also be fed from the mill through the calender stack without a supporting base material, thus providing a thin sheet or film of the compounded interpolymer. It is generally found desirable to cure the calendered films or coated or molded articles before they are adapted to use in commerce. Such cure can be effected at about 138° C. with o without the application of superatmospheri pressure (suitably up to 400 pounds per square inch) for periods up to about 75 minutes.

In addition to the advantageous properties accruing to the new compositions, it has been found that the interpolymerization of vinylidene chloride, butadiene and ethyl acrylate, under the standard conditions of polymerization previously defined, proceeds at a much more rapid rate than does the polymerization of the binary system of vinylidene chloride and butadiene. Thus, when a mixture of 70 parts of vinylidene chloride and 30 parts of butadiene are polymerized under the recited conditions there is obtained a yield of about 67 per cent of the binary copolymer (hereinafter referred to as copolymer A) in 28 hours, representing a polymerization rate of about 2.4 per cent per hour. When, however, a mixture of 35 per cent vinylidene chloride, 35 per cent ethyl acrylate and 30 per cent butadiene is polymerized under like conditions there is obtained an 89 per cent conversion to the interpolymer in 18 hours, representing a polymerization rate of about 4.9 per cent per hour. Not only does the presence of the ethyl acrylate increase the polymerization rate, as contrasted with that of the binary system, but it also permits carrying the polymerization to a higher degree of conversion without encountering any injurious oxidation effects which are met when it is attempted to carry the polymerization of the binary vinylidene chloride-butadiene system beyond about 75 per cent conversion to polymer. When the said binary system is carried beyond about 75 per cent conversion there is a noticeable discoloration of the latex and of the polymer obtainable therefrom. The discolored binary copolymer is defective in such important properties as elasticity and strength and in its ability to be handled on a compounding mill. The present ternary interpolymer, however, does not exhibit this type of degradation, even when polymerization is carried to 90 per cent or higher and the product retains its desirable rubber properties without exhibiting discoloration.

One noticeable advantage of the present ternary interpolymers, when contrasted with the vinylidene chloride-butadiene binary copolymers, is the greater apparent reduction in the low temperature brittle point of the composition. Thus, copolymer A when mixed in the crude, i. e. unvulcanized, state with 1 per cent stearic acid and 1 per cent wax gives a composition having low temperature brittle point of —50° C., while a ternary interpolymer of 55 per cent vinylidene chloride, 15 per cent ethyl acrylate and 30 per cent butadiene, containing the same amounts of stearic acid and wax and tested in the same physical form, i. e. as a calendered film .006 inch thick, has a brittle point of —70° C. Similarly, it is found that compounded and cured slabs of copolymer A and of the same ternary interpolymer have brittle points of —20° C. and —35° C., respectively. This remarkable reduction in the low temperature brittle point is of considerable advantage when it is desired to employ the present composition as fabric coatings or in many other places where the polymeric product may be expected to encounter low temperature conditions.

Abrasion tests carried out on molded sheets 0.1 inch thick made from the uncompounded and unvulcanized polymeric products showed copolymer A, under a particular set of test conditions, to have an average loss in weight of .0016 gram per unit area. Tests carried out under identical conditions showed the present ternary interpolymers containing 30 per cent butadiene, from 35 to 60 per cent vinylidene chloride and from 10 to 35 per cent of ethyl acrylate to be entirely resistant to abrasion, no detectable loss in weight occurring during the test.

The new ternary interpolymers are considerably softer than the vinylidene chloride-butadiene binary copolymers, having hardness values ranging from about 23 to about 38 as contrasted with values of about 43 to about 45 per cent for the binaries. When this property is considered together with the Mooney viscosity data for the corresponding compositions, it is apparent that the new polymeric products have those properties which are most to be desired in compositions to be applied as calendered coatings. The Mooney viscosity is determined at 212° F. on uncured samples of the polymeric compositions in the manner described by Mooney in India Rubber World for April 1, 1935, at page 49. The average value obtained for copolymer A is about 180. The addition of ethyl acrylate into the system in 10 per cent increments up to 50 per cent ethyl acrylate, gives ternary interpolymers having Mooney viscosity values ranging downward to 114. In each of these interpolymers the amount of butadiene was 30 per cent, the balance being vinylidene chloride. The same compositions were tested for their rebound values (Bashore) and the binary was found to have an average value of 15 while the ternaries containing up to 50 per cent ethyl acrylate had values in the range from 5.5 to 12. The new compositions are thus seen to be relatively "dead," a property which is quite desirable in any rubber-like material which may be stitched and flexed, as such compositions show almost no tendency to pull away from the stitches.

When it is desired to produce compounded and cured compositions from the new interpolymers in the manner previously outlined, it is found that a much shorter time is required to effect a complete cure than when dealing with the corresponding binary vinylidene chloride-butadiene copolymers. Thus, when the binary is being cured, hardness and tensile strength may reach a maximum under the standard conditions after about 100 to 120 minutes, while a ternary interpolymer of 55 per cent vinylidene chloride, 15 per cent ethyl acrylate and 30 per cent butadiene reaches the optimum cure in approximately 60 minutes under the same conditions. This is evidenced by plotting changes of tensile strength, permanent set and hardness against curing time.

While the new interpolymers are not intended primarily for electrical insulation purposes, the following data indicate that they may be used at least as satisfactorily for certain types of insulation as may the binary interpolymers of vinylidene chloride and butadiene. The polymeric material reported in the following table all contain 30 per cent butadiene together with the indicated amount of ethyl acrylate and sufficient vinylidene chloride to make a total of 100.

| Per Cent Ethyl Acrylate | Dielectric Constant | | Percent Power Factor | |
|---|---|---|---|---|
| | 1,000 Cycles | 1,000,000 Cycles | 1,000 Cycles | 1,000,000 Cycles |
| 0 | 5.55 | 3.5 | 11.5 | 7.0 |
| 14 | 5.5 | 3.55 | 10.0 | 7.5 |
| 28 | 5.65 | 3.7 | 9.4 | 7.5 |
| 35 | 5.75 | 3.9 | 8.8 | 7.5 |
| 42 | 5.65 | 4.0 | 7.5 | 7.5 |
| 56 | 5.65 | 4.45 | 4.0 | 7.0 |

Compounded and cured samples of the new interpolymers were tested to determine their resistance to the swelling effect of certain common organic solvents. In this test it was found that the present ternaries are somewhat less affected by acetone, cyclohexanone, tetrachloroethane, carbon tetrachloride and benzene than is copolymer A. When polymerization conditions are varied, in known manner, to produce interpolymers of low molecular weight, the above-noted solvent resistance is not obtained, but the so-produced soluble interpolymers may be vulcanized in solution or they may be used as solvent-applied coatings or adhesives and then vulcanized.

The foregoing data have set forth properties of the new interpolymers which are highly desirable in coating compositions and in those to be used in making calendered sheeting. The optimum combinations of such desired properties is found with the new interpolymers when they contain from 30 to 70 per cent vinylidene chloride, from 20 to 45 per cent butadiene and from 10 to 40 per cent ethyl acrylate. When the amount of vinylidene chloride is reduced and that of ethyl acrylate is correspondingly increased, the interpolymers, while still useful for coating purposes, are found to be more advantageous because of their adhesive properties. For this use, compositions are preferred containing from 15 to 50 per cent of vinylidene chloride, from 30 to 50 per cent of ethyl acrylate and from 20 to 45 per cent of butadiene.

It is to be understood that the new interpolymers, whether used as coatings for paper, fabric, leather or other materials or employed as adhesives, may be applied to the surfaces being treated as the crude rubber after coagulation from the latex in which it was formed, or the latex itself may be used as a coating medium which, when dried, deposits the interpolymer on the supporting surface. The choice of coating method may depend to a large extent on the thickness of the coating desired, as it is apparent that much thicker coatings can be formed by a calendering process than may be produced in a reasonable time either by successive applications of a latex or by the usual electro-deposition methods applied to latex coating operations.

When compounded and cured, the entire range of new interpolymers is highly resistant to oil, and such compositions may accordingly be used wherever an oil-resistant synthetic rubber is desired.

Similar results to those reported above are obtained when isoprene is substituted for the butadiene of the reported examples.

We claim:

The vulcanizable ternary interpolymer made by dispersing in water and polymerizing together a monomeric mixture of 55 per cent of vinylidene chloride, 30 per cent of butadiene-1,3 and 15 per cent of ethyl acrylate.

GEORGE WILLIAM STANTON.
CHARLES EVERETT LOWRY.

REFERENCES CITED

The following references are of record in the file of this patent:

UNITED STATES PATENTS

| Number | Name | Date |
| --- | --- | --- |
| 2,313,233 | Fryling | Mar. 9, 1943 |
| 2,380,356 | Youker | July 10, 1945 |
| 2,380,905 | Stewart | July 31, 1945 |
| 2,394,406 | Schoenfeld | Feb. 5, 1946 |
| 2,400,036 | Wooddell | May 7, 1946 |